(12) United States Patent
Day-Richter

(10) Patent No.: US 11,037,329 B2
(45) Date of Patent: Jun. 15, 2021

(54) ENCODING POSITIONAL COORDINATES BASED ON MULTIPLE CHANNEL COLOR VALUES

(71) Applicant: GOOGLE LLC, Mountain View, CA (US)

(72) Inventor: John Day-Richter, Denver, CO (US)

(73) Assignee: Google LLC, Mountain View, CA (US)

( * ) Notice: Subject to any disclaimer, the term of this patent is extended or adjusted under 35 U.S.C. 154(b) by 58 days.

(21) Appl. No.: 16/430,371

(22) Filed: Jun. 3, 2019

(65) Prior Publication Data
US 2020/0380730 A1  Dec. 3, 2020

(51) Int. Cl.
*G06K 9/36*    (2006.01)
*G06T 9/00*    (2006.01)
*G06T 3/40*    (2006.01)
*G06T 1/20*    (2006.01)
*G06T 7/73*    (2017.01)

(52) U.S. Cl.
CPC ............... *G06T 9/00* (2013.01); *G06T 1/20* (2013.01); *G06T 3/4023* (2013.01); *G06T 7/74* (2017.01); *G06T 2207/10024* (2013.01)

(58) Field of Classification Search
CPC .... G06T 9/00; G06T 1/20; G06T 7/74; G06T 3/4023; G06T 2207/10024; G06T 7/90; H04N 5/2254; H04N 19/186; H04N 5/2258; H04N 13/117; H05N 5/2258
USPC ........................................................ 382/232
See application file for complete search history.

(56) References Cited

U.S. PATENT DOCUMENTS

| 4,967,264 | A  | * | 10/1990 | Parulski ................. H04N 1/482 348/271 |
| 6,760,127 | B1 | * | 7/2004  | Shin ........................ H04N 1/52 358/3.03 |
| 8,553,037 | B2 | * | 10/2013 | Smith ..................... G06T 13/40 345/473 |
| 9,939,381 | B1 | * | 4/2018  | Kimmel ............. G01N 21/6458 |
| 10,474,227 | B2 | * | 11/2019 | Carothers ............. G06T 19/006 |
| 10,509,991 | B1 | * | 12/2019 | Walters ................ G06K 9/4652 |
| 2003/0053708 | A1 | * | 3/2003  | Kryukov ................ H04N 19/86 382/261 |
| 2009/0238449 | A1 | * | 9/2009  | Zhang ..................... G06T 7/521 382/165 |
| 2011/0157184 | A1 | * | 6/2011  | Niehsen .................... G06T 5/00 345/440 |
| 2012/0207375 | A1 | * | 8/2012  | Contreras ................ G06T 7/90 382/133 |
| 2013/0182002 | A1 | * | 7/2013  | Macciola ............... H04N 1/387 345/589 |

(Continued)

FOREIGN PATENT DOCUMENTS

WO    WO-2015180854 A1 * 12/2015 ............... G06T 9/00

*Primary Examiner* — Mahendra R Patel

(74) *Attorney, Agent, or Firm* — Dority & Manning, P.A.

(57) ABSTRACT

A GPU receives an image comprising an array of pixels. The image includes at least one pixel of interest, the pixel of interest being positioned a number of pixels along a first axis from a reference and a number of pixels from the reference along a second axis that is orthogonal from the first axis. The GPU sets at least one first color channel of an output image of the pixel of interest based on the position along the first axis and at least one second remaining color channel of the output image of the pixel of interest based on the position along the second axis.

14 Claims, 8 Drawing Sheets
(2 of 8 Drawing Sheet(s) Filed in Color)

(56) References Cited

U.S. PATENT DOCUMENTS

| | | | | |
|---|---|---|---|---|
| 2015/0109355 | A1* | 4/2015 | Wang | H04N 1/4051 |
| | | | | 345/691 |
| 2017/0049311 | A1* | 2/2017 | Borovinskih | G06T 5/20 |
| 2018/0227571 | A1* | 8/2018 | Page | H04N 13/246 |
| 2019/0108643 | A1* | 4/2019 | Wang | F16M 13/022 |
| 2019/0126487 | A1* | 5/2019 | Benaim | B25J 9/1697 |
| 2019/0197693 | A1* | 6/2019 | Zagaynov | G06K 9/3275 |
| 2019/0332840 | A1* | 10/2019 | Sharma | G06K 7/1443 |
| 2020/0387699 | A1* | 12/2020 | Haverkate | G06N 3/08 |

\* cited by examiner

400

700

Collapsed Object 710

ENCODING POSITIONAL COORDINATES BASED ON MULTIPLE CHANNEL COLOR VALUES

TECHNICAL FIELD

The technology disclosed herein is related to graphics processing. Particular examples relate to encoding positional coordinates into multiple channel color values to allow positional information to be retained during subsequent transformations, using graphics processing units ("GPUs").

BACKGROUND

A GPU is an electronic subsystem (typically a chipset) designed to rapidly process images intended for output to a display device. GPUs are used in embedded systems, mobile phones, personal computers, workstations, digital cameras, game consoles, and other digital systems. The highly parallel structure of the GPU makes it more efficient than a general-purpose central processing unit (CPU) for certain tasks.

A "shader" is a type of computer program that was originally used for shading (that is, the production of appropriate levels of light, darkness, and color within an image), but which now can perform a variety of specialized functions in various fields of computer graphics. Shading languages may be used to program a GPU rendering pipeline. The position, hue, saturation, brightness, and contrast of pixels, vertices, or textures used to construct an output image can be altered quickly, using algorithms defined in the shader, and can be modified by external variables or textures introduced by the program calling the shader.

SUMMARY

The technology described herein includes computer implemented methods, computer program products, and systems to encode positional coordinates based on multiple channel color values to retain positional information during subsequent transformations. In some examples of the technology, a GPU receives an image comprising an array of pixels. The image includes at least one pixel of interest, the pixel of interest being positioned a number of pixels along a first axis from a reference pixel and a number of pixels from the reference pixel along a second axis that is orthogonal from the first axis. In an output image, the GPU sets at least one first color channel of the image of the pixel of interest based on the position along the first axis and at least one second remaining color channel of the output image of the pixel of interest based on the position along the second axis.

In some examples, pixels that are not pixels of interest are set to a default color. In some examples, the settings of the color channels are based on a mathematical algorithm that represents the position along the first axis and the second axis.

In some examples, the position along the first axis is represented in a set of two channels and the position along the second axis is represented in a different set of two channels.

BRIEF DESCRIPTION OF THE DRAWINGS

The application file contains at least one drawing executed in color. Copies of this patent application publication with color drawing(s) will be provided by the Office upon request and payment of the necessary fee.

DETAILED DESCRIPTION OF THE EXAMPLES

Overview

In document scanning applications, a GPU or other processor requires a method to find the edges, corners, or other boundaries of the document to be scanned. When certain locations of the image are identified, such as the four corners of a rectangular object in an image, pixels at the identified locations are determined to be pixels of interest. In an output image, the GPU encodes positional coordinates of the pixels of interest into multiple channel color values to allow positional information to be retained during subsequent transformations.

Examples of the technology disclosed herein encode the pixels of interest in an output image with a color value for each of one or more color channels that represents the positional information of the pixel. The encoding allows the positional information to be retained with the pixel even when subsequent transformations are performed on the image. For example, the pixel positional information is retained even if the image is decimated, enlarged, or rotated. The technology can be employed to perform image-processing tasks in a way that makes use of the computing device's resources more efficient. For example, if the image undergoes a decimation process, the GPU or other processor uses fewer resources to store or communicate the image. In a conventional system the decimation would destroy the positional information of the pixels of interest. In the technology described herein, the positional information will remain encoded in the pixel of interest.

In examples herein, the positional information is encoded on four color channels. Using four color channels in an 8-bit system allows sufficient positional resolution for most practical applications. In other examples, one, two, eight, or any other suitable number of color channels may be used, depending on the specificity of the data to be stored, the resolution capacity of the color channels, and the number of color channels available. The data is encoded based on one or more processes that characterizes the position along a first axis and along a second axis that is orthogonal to the first axis. When an output image is created, the pixels of interest are encoded with the color channel data. The pixels that are not pixels of interest can be set to a default color, such as black. When the GPU requires the positional information of the image at a later time, the positional information may be accessed in the color channels and extracted.

Example System Architectures

Figure 1:
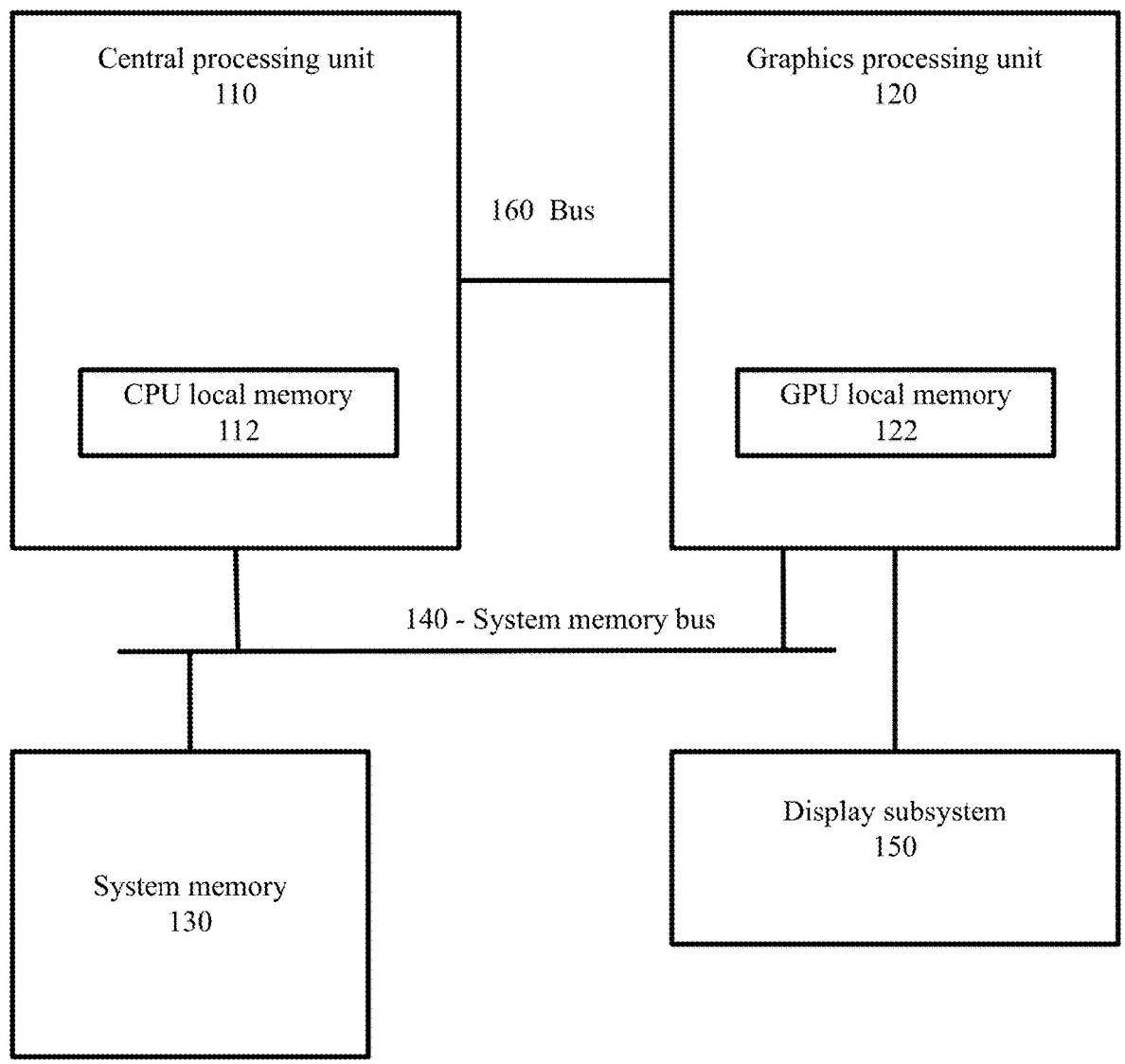
FIG. 1 is a block diagram depicting a portion of a simplified communications and processing architecture of a typical device offering a graphics processing unit ("GPU") for image processing, in accordance with certain examples of the technology disclosed herein.

FIG. 1 is a block diagram depicting a portion of a simplified communications and processing architecture 100 of a typical device offering a graphics processing unit ("GPU") for image processing, in accordance with certain examples of the technology disclosed herein. While each element shown in the architecture is represented by one instance of the element, multiple instances of each can be included. While certain aspects of operation of the present technology are presented in examples related to FIG. 1 to facilitate enablement of the claimed invention, additional features of the present technology, also facilitating enablement of the claimed invention, are disclosed elsewhere herein.

In such an architecture 100, a central processing unit ("CPU") 110 and a graphics processing unit ("GPU") 120 share access to system memory 130 via a system memory bus 140. The CPU 110 and the GPU 120 communicate messages and data over a bus 160 that may also connect to other processors, sensors, and interface devices (not shown). Each of CPU 110 and GPU 120 include local memory (CPU local memory 112, GPU local memory 122). Shaders used in examples of the technology disclosed herein can be stored in GPU local memory 122, along with input data to the shaders and output data from the shaders. Local memory can include cache memory. Cache memory stores data (or instructions, or both) so that future requests for that data can be served faster; the data stored in a cache might be the result of an earlier computation or a copy of data stored elsewhere. A cache hit occurs when the requested data can be found in a cache, while a cache miss occurs when the data cannot be found. Cache hits are served by reading data from the cache, which typically is faster than recomputing a result or reading from a slower data store such as system memory 130 or transfer between the CPU 110 and GPU 120. Thus, the more requests that can be served from the cache, the faster the system performs. The GPU 120 typically operates on data from local memory to drive display subsystem 150. Display subsystem 150 can be an output-only subsystem or an interactive display subsystem 150. Throughout the discussion of examples, it should be understood that the terms "data" and "information" are used interchangeably herein to refer to text, images, audio, video, or any other form of information that can exist in a computer-based environment.

The architecture 100 illustrated is an example, and other means of establishing a communications link between the functional blocks can be used. Moreover, those having ordinary skill in the art having the benefit of the present disclosure will appreciate that the elements illustrated in FIG. 1 may have any of several other suitable computer system configurations. For example, the architecture 100 may be embodied as a mobile phone or handheld computer and may not include all the components described above.

Figure 8:
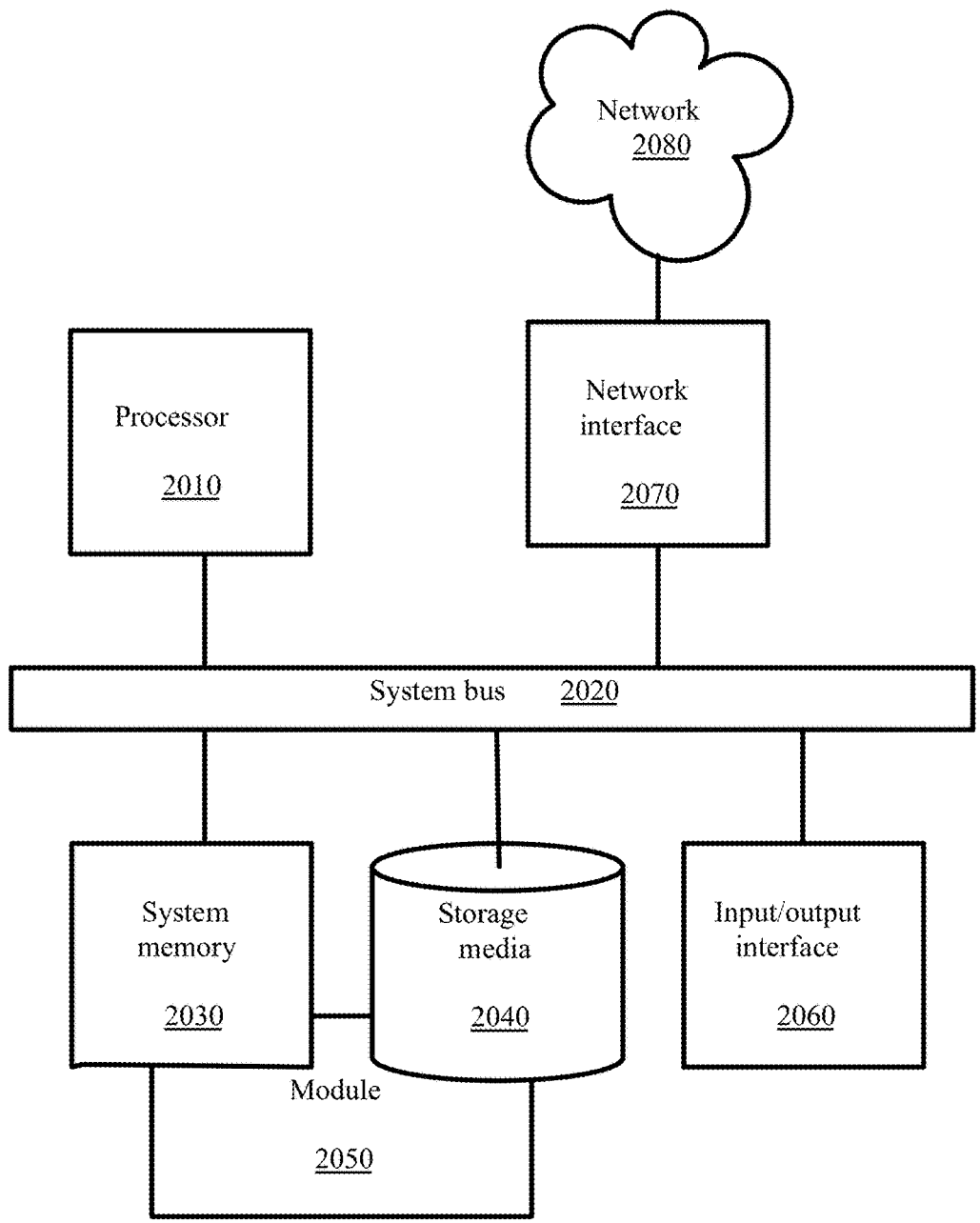
FIG. 8 is a block diagram depicting a computing machine and modules, in accordance with certain examples.

In examples the technology presented herein may be part of any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may be any of the modules discussed in more detail with respect to FIG. 8. The computing machines discussed herein may communicate with one another as well as other computer machines or communication systems over one or more networks. The network may include any type of data or communications network, including any of the network technology discussed with respect to FIG. 8.

Example Processes

Figure 2:
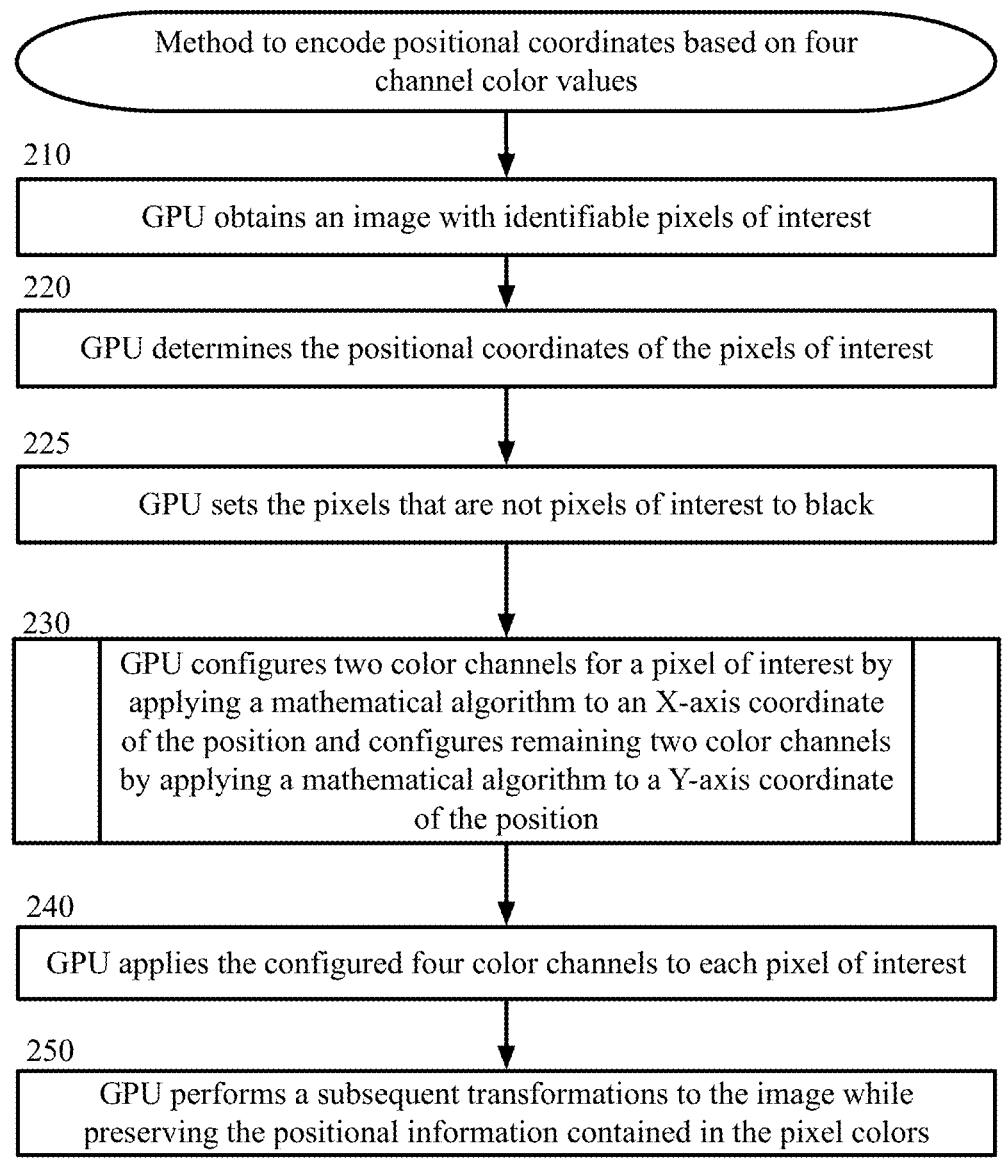
FIG. 2 is a block diagram illustrating methods to encode positional coordinates based on multiple channel color values, in accordance with certain examples of the technology disclosed herein.
Figure 3:
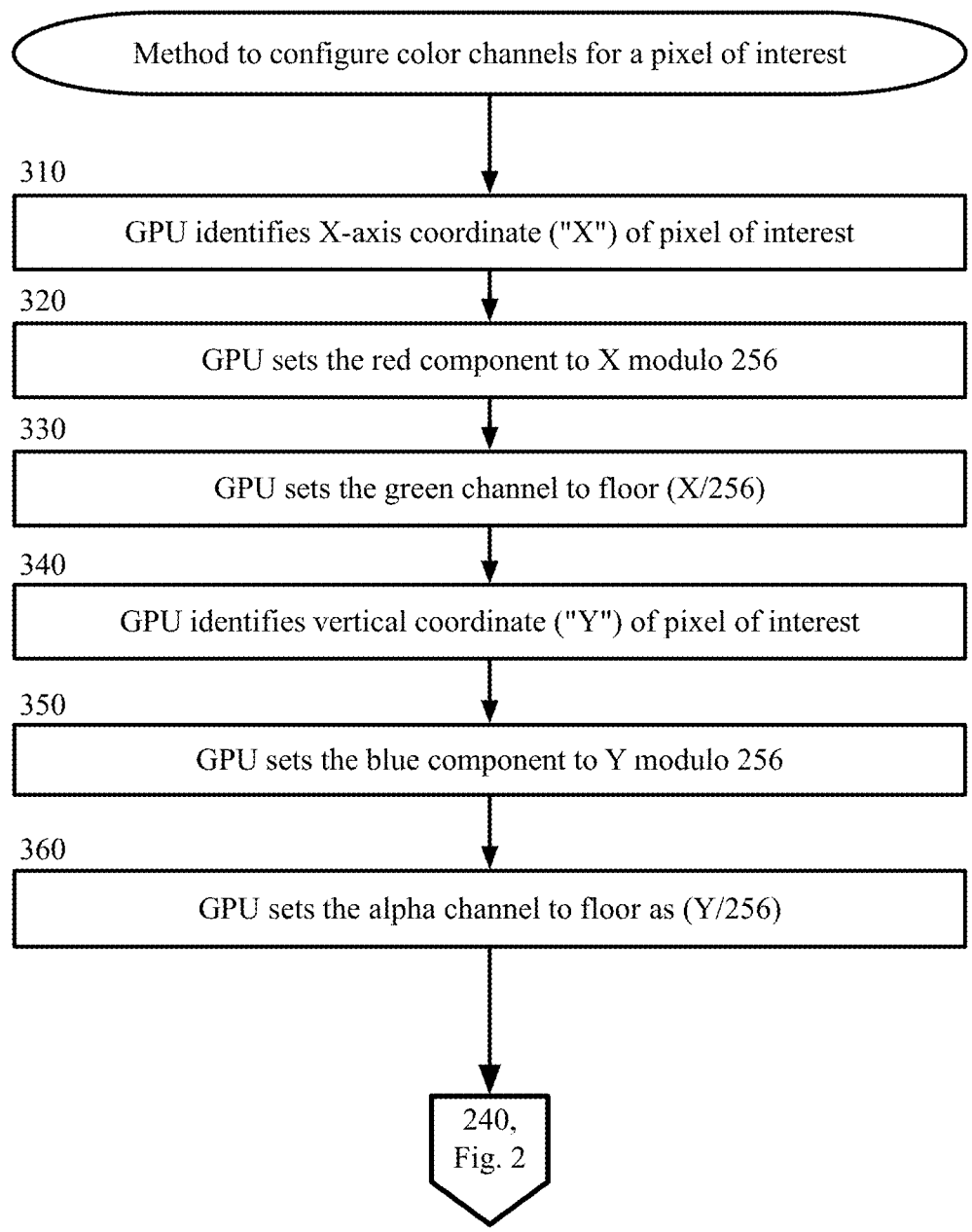
FIG. 3 is a block diagram illustrating methods to configure color channels for a pixel of interest, in accordance with certain examples of the technology disclosed herein.

The example methods illustrated in FIGS. 2-3 are described hereinafter with respect to the components of the example architecture 100. The example methods also can be performed with other systems and in other architectures involving a graphics processing unit ("GPU") 120. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a GPU 120 implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.) by a GPU 120.

Referring to FIG. 2, and continuing to refer to FIG. 1 for context, a block diagram illustrates methods 200 to encode positional coordinates based on channel color values, in accordance with certain examples of the technology disclosed herein.

The color channels in the examples are interchangeable and may be substituted freely. Any color combination or order may be used for the one or more channels. Each pixel has a color value based on four color channels, or other suitable number of channels depending on the color system used by the GPU 120. For example, the color of a pixel can be represented by a vector having components for red ("R"), blue ("B"), and green ("G") color intensities of the pixel. Examples disclosed herein operate on input images of the OpenGL® "RGBA" format but are not restricted to that format. OpenGL is a cross-language, cross-platform application programming interface ("API") for rendering graphics. The API is typically used to interact with a GPU 120 to achieve hardware-accelerated rendering. OpenGL enables the use of programs called "shaders" to manipulate images. In addition to 8-bit values for each of red, green, and blue, the OpenGL RGBA format uses an 8-bit "A," or "alpha," component. The 8-bit format provides 256 discrete values from "0" to "255" for each pixel. The alpha component is typically used to represent the transparency of a pixel.

In OpenGL, color values can be stored in one of three ways: normalized integers, floating-point, or integral. Both normalized integer and floating-point formats will resolve, in a shader, to a vector of floating-point values; whereas integral formats will resolve to a vector of integers. Examples presented herein use the integral format for each of "R," "B," "G," and "A."

In block 210, a GPU 120 obtains an image with identifiable pixels of interest. The image may be an image of an object, such as a document, a receipt, a product label, a bar code, or any other object of interest. The GPU 120 may create an output image on which to perform any suitable process. The GPU 120 may obtain the image and create the output image for any suitable reason. For example, the GPU 120 obtains the image from which to extract data, such as by performing an optical character recognition algorithm. In another example, the GPU 120 obtains the image to create an output image to reduce the size of the image for easier storage. In another example, the GPU 120 obtains the image and creates an output image to perform any suitable process to the image, such as changing the colors, texture, backgrounds, or any other image characteristics. In examples herein, the image being processed may be simply referred to as the "image," whether the image is actually the original image or an output image. The described processes may be performed on the original image or an output image.

Figure 4:
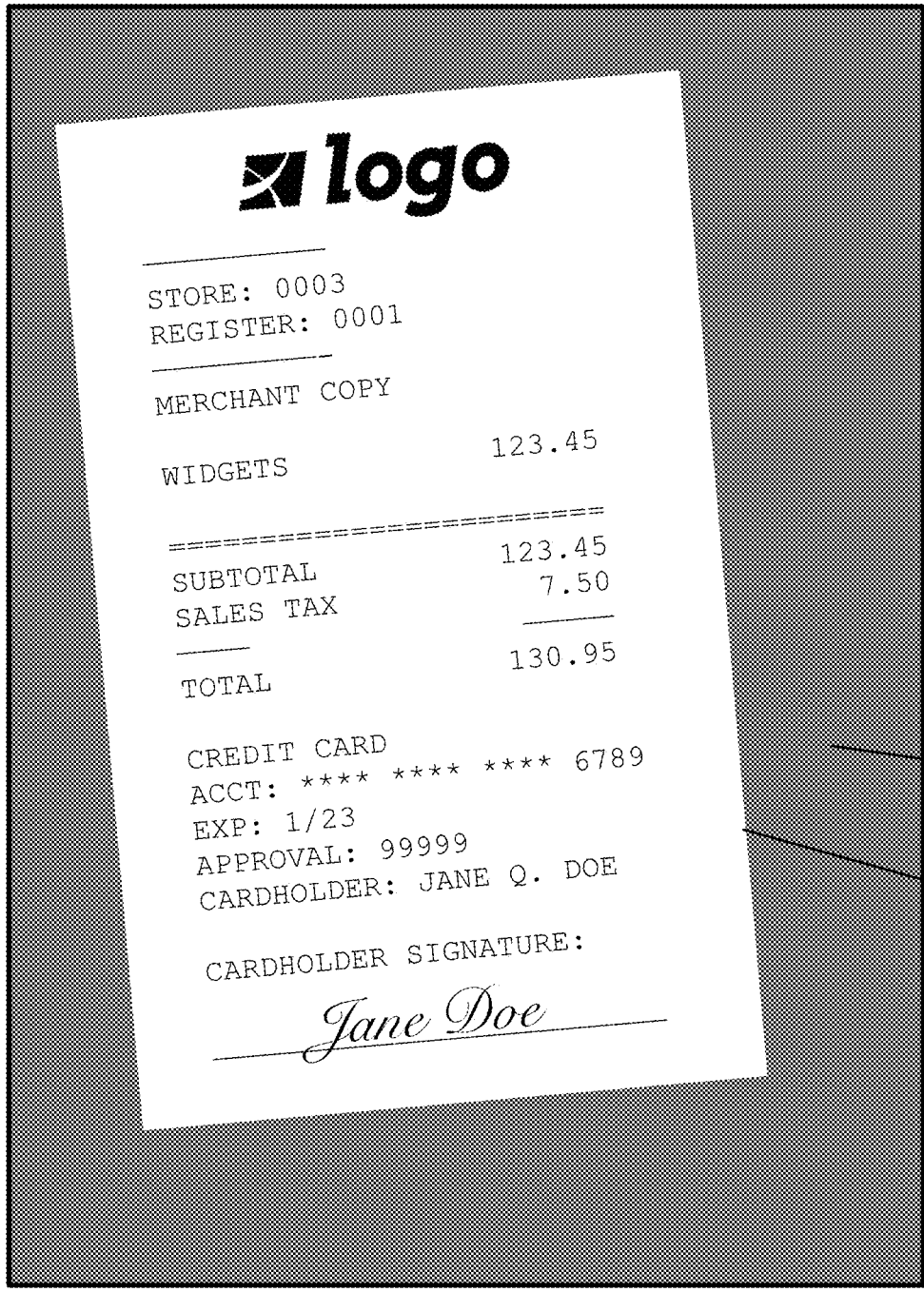
FIG. 4 is a representation of an example image of an object (a receipt) upon which the technology disclosed herein operates, in accordance with certain examples of the technology disclosed herein.

FIG. 4 is an example image 400 of an object (a receipt) 410 upon which the technology disclosed herein operates, in accordance with certain examples of the technology disclosed herein. In this example image, the object 410 sits upon an image background 420, for example a table top, a desktop, or a merchant's counter. The object 410 includes object features, such as text, a logo, or a signature (shown in FIG. 4 as examples). Other object features in an image 400 can include smudges, folds, creases, stains, stamps, and the like. The object features sit in an object field (typically a light color). Note that both the object features and the image background 420 contrast with the object field. In a continuing example, the image 400 is of a credit card receipt 410 sitting on a merchant's counter 420. The features are receipt data including a logo, alphanumeric information (for example, "STORE: 0003," "ACCT," and "EXP: 1/23"), and the customer's signature.

The image 400 includes pixels of interest. The pixels of interest may include any pixel that allows for easier referencing, storage, or processing of the image. For example, pixels of interest may include the four corners of the image object 410. Knowing the positions of the four corners, allows the GPU 120 to know the sections of the total image that include the object 410 and the sections that represent the background 420. The pixels of interest may be each pixel that includes text. That is, each pixel that makes up the body of each letter of text is a pixel of interest. In another example, any pixel that displays a logo is a pixel of interest.

Returning to FIG. 2, in block 220, the GPU 120 determines the positional coordinates of the pixels of interest in the image 400. The image is composed of a two-dimensional array of pixels. Depending on the resolution of the image and the device displaying the image, the image is displayed on the array with each pixel displaying a color. In an example, the array is denoted with vertical and horizontal coordinates originating from the bottom, left position on the image display. The origin is represented by a reference point that is at a vertical position of 0 and a horizontal position of 0. The vertical position of the pixel may be represented by counting the number of pixels up from the bottom of the image until the pixel is reached. The horizontal position of the pixel may be represented by counting the number of pixels over from the left side of the image until the pixel is reached.

The two positions may be represented as Cartesian coordinates with the horizontal position represented as X and the vertical position represented as Y.

Figure 5:
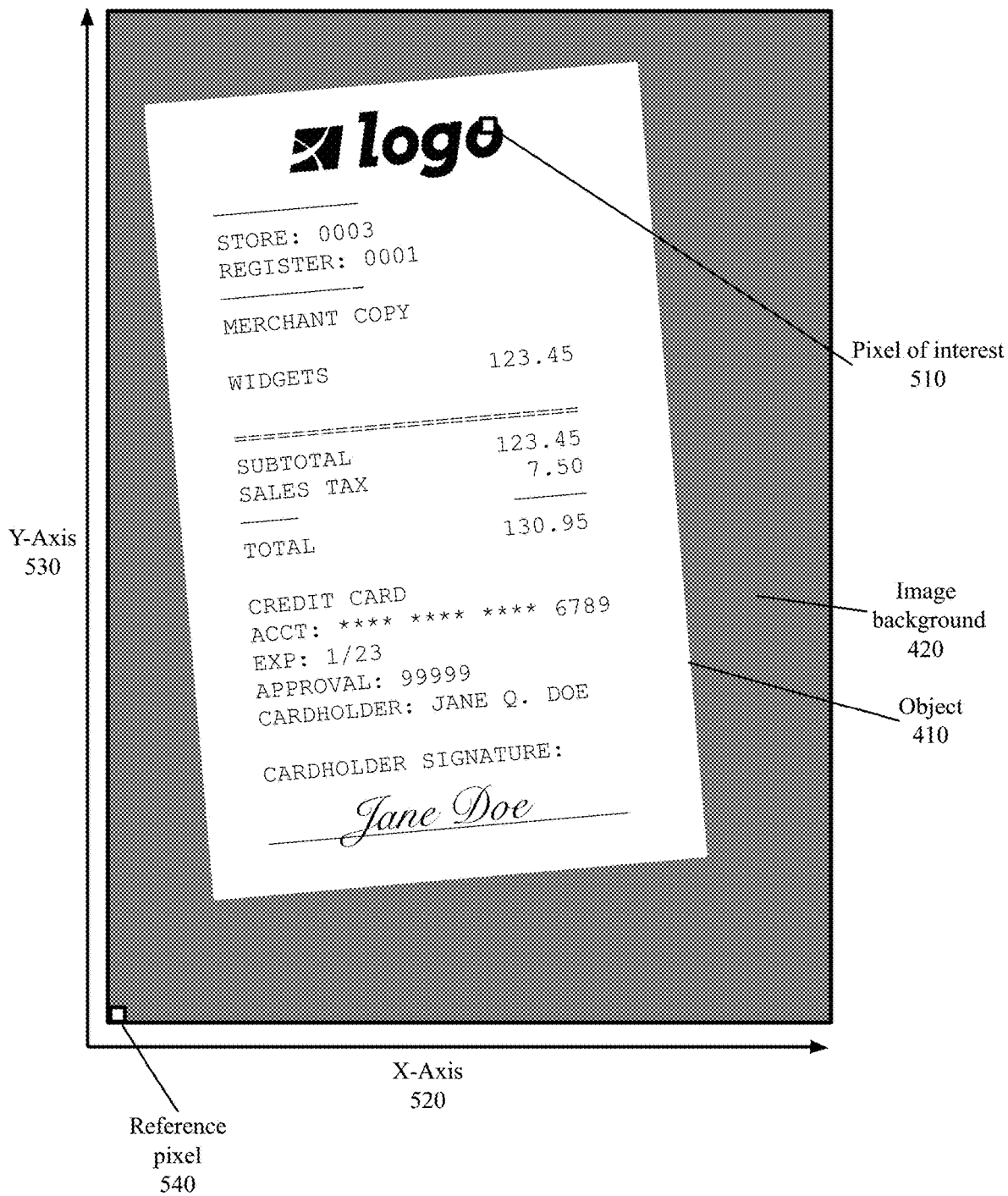
FIG. 5 is a representation of an example image of an object (a receipt) with a particular pixel identified as a potential pixel of interest, in accordance with certain examples of the technology disclosed herein.

FIG. 5 is a representation of an example image of an object 400 (a receipt) with a particular pixel 510 identified as a potential pixel of interest, in accordance with certain examples of the technology disclosed herein. The X-Axis 520 and Y-Axis 530 are illustrated on the display as being horizontal and vertical axes, respectively, with a reference pixel 540 on the bottom left. However, any other configuration of axes may be utilized with any other suitable reference point. The sections of the total image that include the object 410 and the sections that represent the background 420 are illustrated. Based on an identification of text in the object 410, a pixel that displays a portion of the text is identifiable as a possible pixel of interest. In the example, one of the pixels of interest 510 is identified a displaying a portion of the logo text.

The GPU 120 identifies the X and Y coordinates of the pixel of interest 510 by counting the pixels from a reference pixel 540 at the bottom left corner of the image 400. The GPU 120 may "count" the pixels in any suitable manner. For example, the GPU 120 may note the position of the pixel of interest 510 and the reference pixel 540 and determine the distance between the two. Based on the number of pixels per unit of distance, the GPU 120 calculates the number of pixels between the two.

The reference pixel 540 has X and Y coordinates of (0,0) in the example. The X coordinate is determined from the number of pixels along the X-Axis 520 from the reference pixel 540, and the Y coordinate is determined from the number of pixels along the Y-Axis 540 from the reference pixel 540. In the continuing example, the pixel of interest 510 has X and Y coordinates of (500, 1000). That is, the coordinates would be X=500 and Y=1000.

In block 225 the GPU 120 sets the color of each pixel that is not a pixel of interest to a default value. After identifying each pixel of interest 510, the GPU 120 determines that each remaining pixel of the image is not a pixel of interest. Each remaining pixel is set to a default color that does not encode the position of the pixel. In an example, the default color is black. Any other suitable default color may be used.

In block 230, the GPU 120 configures two color channels for a pixel of interest 510 by applying a mathematical algorithm to an X-axis coordinate of the position, and configures remaining two color channels by applying a mathematical algorithm to a Y-axis coordinate of the position. Block 230 is described in greater detail with respect to FIG. 3.

FIG. 3 is a block diagram illustrating methods 230 to configure color channels for a pixel of interest 510, in accordance with certain examples of the technology disclosed herein.

In block 310 of FIG. 3, the GPU 120 identifies an X-axis coordinate ("X") of pixel of interest 510. In the continuing example, X is equal to 500. That is, the pixel of interest 510 is 500 pixels along the X-axis from the reference pixel 540. The determination of X may be performed by a function of the GPU 120 or a different computing device. The number and density of the pixels may be determined by the resolution of the image and the capacity of the user interface of the computing system.

In block 320, the GPU 120 sets the red component to X modulo 256. In the example, the red channel is set to the X-axis 1's place. Each channel of the four color channels is 8-bits wide in the example. If the system did not employ a four channel scheme, or if 16, 32, or 64 bits were used per channel, then different numbers would be used in the function according to the type of system. The 8 bits for each channel creates a system that uses a base 256 for the setting of the color channels. The number of bits may be visualized as the variable "B." The mathematical base for the example with 8 bit channels is $2^B$, or $2^8$, which is base 256. If the channels utilized 16, 32, or 64 bits, then the base would change accordingly.

If the system utilizes two channels for each axis, and each channel represents a place value in a base 256 system, then each axis has a possible 256^2=65,536 possible X-axis positions. Similarly, the Y-axis would have 256^2=65,536 possible Y-axis positions. Using an 8 bit system with two color channels, one channel is set as the 1's place for one of the axes, and another channel can be the 256's place for one of the axes.

To calculate the 1's place for the pixel of interest 510 in this example, the GPU 120 sets the first channel, such as the red channel, to X modulo 256. To calculate the modulo function, X is divided by 256. The modulo result is the remainder from the division. As X is determined above to be equal to 500, in the function 500 modulo 256, the result would be the remainder of 500 divided by 256, which is 244. Thus, the red channel would be set to 244.

In block 330, the GPU 120 sets the green channel to floor (X/256). A floor function rounds down a number to the nearest integer. In this example, floor (X/256) rounds down the result of X/256. As X=500, the result of (500/256) is equal to approximately 1.95. Thus, the floor of (500/256) would be equal to 1.

The green channel thus represents the 256's place for the position of the pixel of interest 510. Thus, the X-axis position of the pixel of interest 510 would be encoded as 1 244, with 1 being in the 256's place and 244 being in the 1's place.

In block 340, the GPU 120 identifies an Y-axis coordinate ("Y") of the pixel of interest 510. In the continuing example, Y is equal to 1000. That is, the pixel of interest 510 is 1000 pixels along the Y-axis from the reference pixel 540. The counting of the pixels may be performed by a function of the GPU 120 or a different computing device, such as the CPU 110. The number and density of the pixels may be determined by the resolution of the image and the capacity of the user interface of the computing system.

The representation of Y in blocks 350 and 360 is calculated in a similar method as described above with respect to the X coordinate as described in blocks 320 and 330.

In block 350, the GPU 120 sets the blue component to Y modulo 256. In the example, the blue channel is set to the Y-axis 1's place. To calculate the 1's place for the pixel of interest 510 in this example, the GPU 120 sets the first channel, such as the red channel, to Y modulo 256. As Y is determined above to be equal to 1000, in the function 1000 modulo 256, the result would be the remainder of 1000 divided by 256, which is 232. Thus, the blue channel would be set to 232. In block 360, the GPU 120 sets the alpha channel to floor (Y/256). As Y=1000, the result of (1000/256) is equal to approximately 3.90. Thus, the floor of (1000/256) would be equal to 3.

The alpha channel thus represents the 256's place for the position of the pixel of interest 510. Thus, the Y-axis position of the pixel of interest 510 would be encoded as 3 232, with 3 being in the 256's place and 232 being in the 1's place.

In an alternate example, only a single color channel is used to encode each axis of the position of the pixel of interest 510. That is, instead of using two channels, such as red and green, to encode the X, only a single color channel is used. In such a situation, a smaller range of pixels may be encoded than with multiple channels. In other examples, that use a number of bits, B, that is greater than 8, a greater range of pixels may be encoded. In other examples, more color channels than one, two, or four may be used, if available.

In alternate examples, the colors used for the X and Y encoding may be used in any configuration. That is, the colors red, green, blue, and alpha may represent X or Y in any suitable arrangement. Additionally, other color channels may be used if the GPU 120 uses an alternate color format. For example, certain color formats use different base colors than RGBA. Any suitable color channels may be configured to practice the method 200 of the technology.

In alternate examples, other mathematical functions may be used to represent the position of X or Y instead of modulo and floor. Other mathematical bases may be used than base 256. Any mathematical function that converts the position of X and Y to configurable color channel data may be utilized.

In an example, the GPU processes each pixel of the array of pixels in parallel.

From block 360, the method 230 returns to block 240 of FIG. 2.

Returning to FIG. 2, in block 240, the GPU 120 applies the configured four color channels to each pixel of interest 510. In an example, after calculating the appropriate color values for each channel for X and Y of the pixel of interest 510, the GPU 120 stores the values with the pixel of interest 120 in an output image. The output image is a stored image that is used for further processing or display. The output image includes the encoded color channel data.

Figure 6:
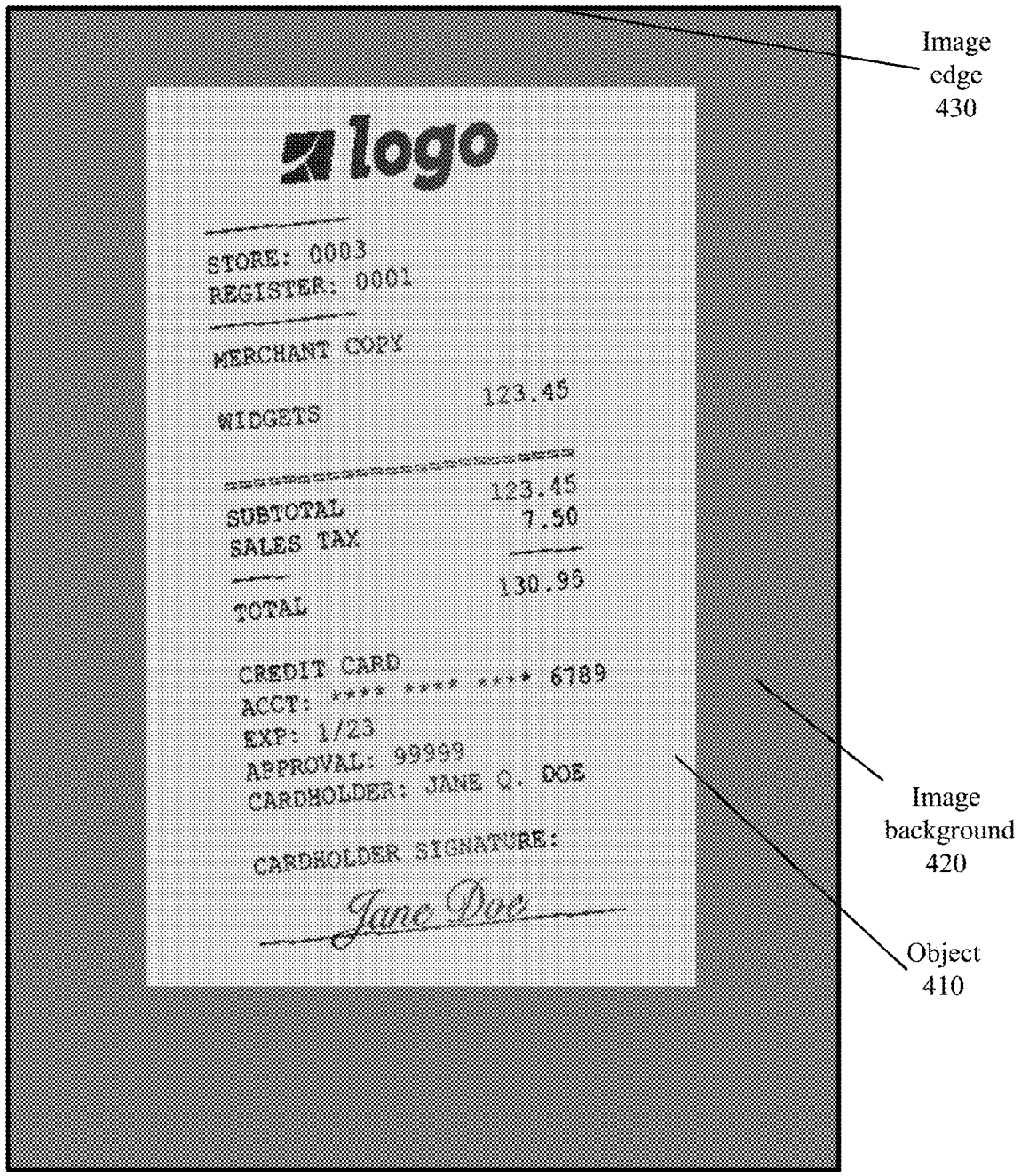
FIG. 6 is a representation of an example image of an object after setting the remaining pixels to a default color, in accordance with certain examples of the technology disclosed herein.

FIG. 6 is a representation of an example image 500 after setting the remaining pixels to a default color, in accordance with certain examples of the technology disclosed herein. The pixel of interest 510 and each other pixel that represents a portion of the text is encoded with the positional data and is not set to the default color. The remaining pixels of the image are set to a light grey, the default color in the example. Only the pixels that are identified as being in the object 410 are set to the default color. Pixels located in the image background 420, are not set to the default color. In other examples, the pixels in the image background 420 are also set to the default color.

In block 250, the GPU 120 performs a subsequent transformation to the image while preserving the positional information contained in the pixel colors. After storing the image with the pixels of interest 510 encoded with the positional data, the GPU 120 may perform other transformations of the image without losing the positional information in the transformation. For example, the GPU 120 may decimate, or shrink, the image to a smaller size with a lower resolution. In an example, the GPU 120 stores an output image that only includes the pixels of interest in a compressed or collapsed state. The pixels that are not pixels of interest are omitted. Because the pixels of interest have an encoded position, the image does not need to maintain the original proportions or structure. If the original image is to be reconstituted or replicated, the pixels of interest are placed in the proper position on the XY coordinates of the replicated image based on the encoded positions. The remaining pixels of the replicated image are set to a default color.

In another example, the image may be reversed or rotated. Any suitable manipulation of the image may be performed by the GPU 120. Because the positional information is encoded on the pixels of interest 510, the GPU 120 is able to identify the original configuration of the image by accessing the positional information of the pixels of interest 510. For example, by identifying the original configuration of the image by accessing the positional information of the pixels of interest 510, the GPU can return the image to the original configuration.

Figure 7:
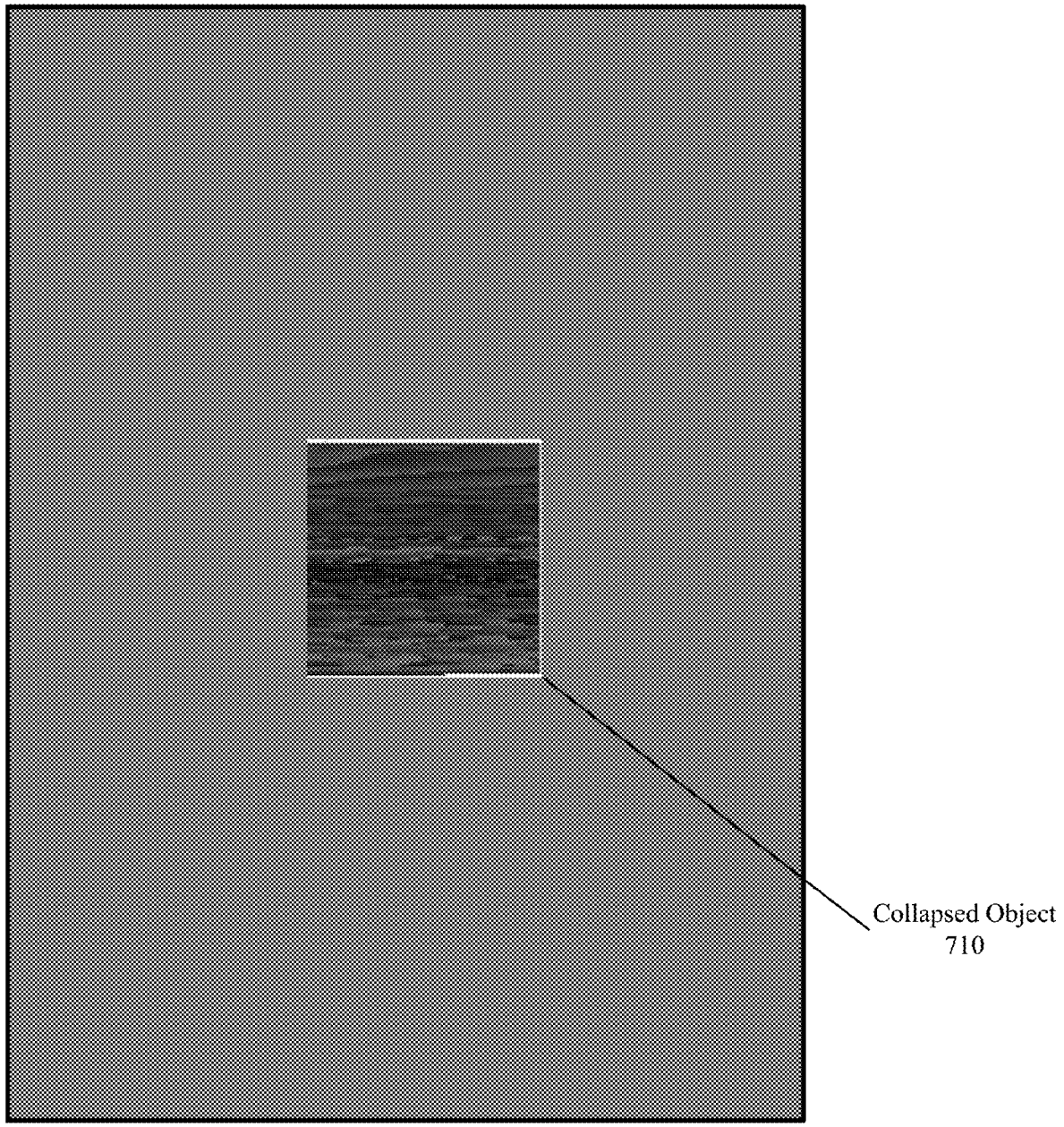
FIG. 7 is a representation of an example image after collapsing the image to display only the pixels of interest, in accordance with certain examples of the technology disclosed herein.

FIG. 7 is a representation of an example image 700 after collapsing the image to display only the pixels of interest, in accordance with certain examples of the technology disclosed herein. This collapsed image 710 requires less storage space than would be required to store the original image. Each pixel of the collapsed image 710 includes a pixel of interest. If the collapsed image 710 is expanded to replicate the original image, a GPU 120 would extract the positional information encoded in the color value. The replicated image would display each pixel of interest in the proper location and fill in the other pixels with a default color.

Other Examples

FIG. 8 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random-access memory ("RAM"), static random-access memory ("SRAM"), dynamic random-access memory ("DRAM"), and synchronous dynamic random-access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Moreover, any reference to an act being performed by a computer should not be construed as being performed by a single computer as more than one computer may perform the act.

The examples described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples.

Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

The invention claimed is:

1. A computer-implemented method to encode positional coordinates based on a four channel color configuration, comprising:
by a graphics processing unit (GPU):
receiving an input image comprising an array of pixels, the array of pixels comprising a plurality of pixels of interest, the plurality of pixels of interest having respective X positions that are respectively distanced along an X-axis from a reference pixel and having respective Y positions that are respectively distanced from the reference pixel along a Y-axis that is orthogonal to the X-axis;
generating an output image, wherein generating the output image comprises:
mapping X positional information describing the respective X positions of the plurality of pixels of interest to a first color channel of the output image and a second color channel of the output image; and
mapping Y positional information describing the respective Y positions of the plurality of pixels of interest to a third color channel of the output image and a fourth color channel of the output image; and
performing a subsequent transformation to the output image while preserving the X positional information and Y positional information based on the four channel color configuration.

2. The method of claim 1, wherein receiving comprises:
  determining, for each pixel of the array of pixels of the input image whether or not the respective pixel is included in the plurality of pixels of interest; and
  for each pixel determined not included in the plurality of pixels of interest, setting each of the first color channel of the output image, the second color channel of the output image, the third color channel of the output image, and the fourth color channel of the output image at a corresponding position in the output image to a default value.

3. The method of claim 1, wherein mapping the respective X positions of the plurality of pixels of interest and mapping the respective Y positions of the plurality of pixels of interest based on one or more data characterizations that interprets positions along the X-axis and the Y-axis.

4. The method of claim 1, wherein the GPU processes each pixel of the array of pixels in parallel.

5. The method of claim 1, wherein the first color channel, the second color channel, the third color channel, and the fourth color channel comprise a red channel, a blue channel, a green channel, and an alpha channel.

6. The method of claim 5, wherein a respective number of bits in each of the first color channel, the second color channel, the third color channel, and the fourth color channel is represented as B bits, wherein B is equal to 8, 16, or 64.

7. The method of claim 6, further comprising determining the X positional information by determining respective numbers of pixels between the reference pixel and the respective X positions along the X-axis.

8. The method of claim 7, further comprising determining the Y positional information by determining respective numbers of pixels between the reference point and the respective Y positions along the Y-axis.

9. The method of claim 1, wherein:
  mapping the X positional information describing the respective X positions of the plurality of pixels of interest to the first color channel of the output image and the second color channel of the output image comprises:
    setting the first color channel as representing respective 1's places of the respective X positions; and
    setting the second color channel as representing respective 2B's places of the respective X positions; and
  determining the Y positional information comprises:
    setting the third color channel as representing respective 1's place of the respective Y positions; and
    setting the fourth color channel as representing 2B's places of the respective Y positions.

10. The method of claim 9, wherein:
  setting the first color channel as representing respective 1's places of the respective X positions comprises setting the first color channel based on a function X mod (2^B), wherein X represents the respective X positions of the plurality of pixels of interest;
  setting the second color channel as representing respective (2^B)'s places of the respective X positions comprises setting the second color channel based on a function floor (X/(2^B));
  setting the third color channel as representing the respective 1's places of the respective Y positions comprises setting the second color channel based on a function Y mod (2^B) wherein Y represents the position along the Y-axis; and
  setting the fourth color channel as representing the respective (2^B)'s places of the respective Y positions comprises setting the second color channel based on a function floor (Y/(2^B))

wherein $2^B$ is equal to $2^8$, $2^{16}$, or $2^{64}$.

11. The method of claim 1, wherein the subsequent transformation comprises a decimation transformation.

12. A computer program product, comprising:
  a non-transitory computer-readable storage device having computer-executable program instructions embodied thereon that when executed by a graphic processing unit (GPU) cause the GPU to encode positional coordinates based on channel color values, the instructions comprising instructions to:
  receive an input image comprising an array of pixels, the array of pixels comprising a plurality of pixels of interest, the plurality of pixels of interest having respective X positions that are respectively distanced along an X-axis a reference pixel and having respective Y positions that are respectively distanced from the reference pixel along a Y-axis that is orthogonal to the X-axis;
  configure at least one color channel of an output image based on respective X positions of the plurality of points of interest;
  configure at least one other color channel of the output image based on respective Y positions of the plurality of points of interest; and
  perform a subsequent transformation to the output image while preserving X positional information describing the respective X positions of the plurality of points of interest and the Y positional information describing the respective Y positions based on a four channel color configuration.

13. The computer program product of claim 12, wherein respective values of the at least one color channel and respective values of the at least one other color channel are based on one or more mathematical algorithms that represents the respective positions position along the X-axis and along the Y-axis of the plurality of points of interest.

14. A system to encode positional coordinates based on channel color values, the system comprising:
  memory; and
  a GPU coupled to the memory, wherein the GPU executes instructions that are stored in the memory to cause the system to:
  receive an input image comprising an array of pixels, the array of pixels comprising a plurality of pixels of interest, the plurality of pixels of interest having respective relative X positions that are respectively distanced from a reference pixel along an X-axis and having respective Y positions that are respectively distanced from the reference pixel along a Y-axis that is orthogonal to the X-axis;
  for each pixel of the plurality of pixels of interest:
    setting at least one color channel of an output image based on the X positions of the plurality of pixels of interest; and
    setting at least one other color channel of the output imagebased on the Y positions of the plurality of pixels of interest;
  for each pixel that is not included in the pixels of interest, setting each of the at least one color channel and the at least one other color channel of the output image to a default value; and
  perform a subsequent transformation to the output image while preserving, in the at least on color channel and the at least one other color channel, X positional information describing the respective X positions of the plurality of pixels of interest and Y positional information describing the respective Y positions of the plurality of pixels of interest based on a four channel color configuration.

* * * * *